May 1, 1945. W. G. MARTIN 2,374,763
ENAMEL COATED WELDED JOINT
Filed Oct. 10, 1942

Wesley G. Martin
INVENTOR.
BY *Elvin A. Andrus*
ATTORNEY.

Patented May 1, 1945

2,374,763

UNITED STATES PATENT OFFICE 2,374,763

ENAMEL COATED WELDED JOINT

Wesley G. Martin, Milwaukee, Wis., assignor to A. O. Smith Corporation, Milwaukee, Wis., a corporation of New York Application October 10, 1942, Serial No. 461,581

9 Claims. (Cl. 285—111)

This invention relates to enamel coated welded joints and is applicable in the construction of enamel lined pipe and of connections welded to enamel lined tanks.

In the commercial construction of ceramic lined domestic water heater tanks, for instance, it has been the practice to employ an alloy connection which is welded to the tank wall, and then to depend upon a mechanical protection of the joint from corrosion. Attempts to weld such parts together first and then to apply a vitreous or ceramic enamel lining thereto extending over the joint have encountered difficulty. The enamel has a tendency to craze at or adjacent the weld line.

The principal object of the present invention is to prevent crazing of the enamel at the weld juncture between two members of different metallic composition.

In accomplishing this object, a discovery of substantial importance and commercial application was made. It was found that the crazing of the enamel was primarily caused by the different rates of expansion of the two members under thermal changes, and that if at the line of the joint exposed to the enamel, one member could be made thin and to overlap the thicker and stronger member for a substantial distance, its expansion or movement would be controlled by that of the stronger member for some distance from the line of joinder, so that the gradient between the movement of one metal member and that of the other would not be restricted to the fairly sharp line of weld or braze, but would extend for a substantial distance alleviating concentrated stress conditions which injure the enamel.

According to the invention the joint is tapered in the direction of the thickness of the same, and the thinner edge of one member is disposed on the side to be enameled. The joint employed may be either brazed or electric resistance welded, and should be ground smooth on the surface to be enameled. The enamel employed is of the ceramic or vitreous type bonded to the metal by fusion.

The accompanying drawing illustrates typical embodiments of the invention.

Figure 1 of the drawing is a side elevation of two pipes joined together according to the present invention, with the joint sectioned on its longitudinal center line;

Figure 1:
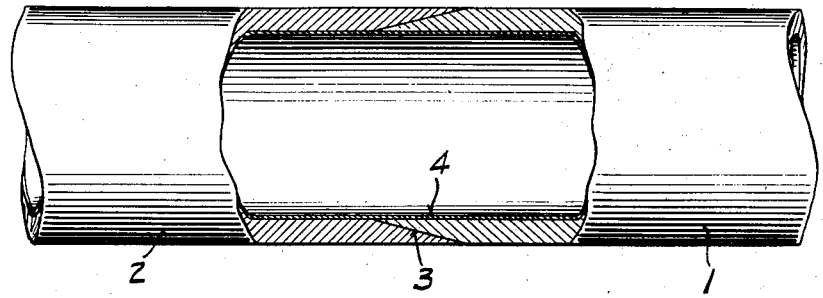

Referring to Fig. 1, the pipe 1 is of ordinary steel while the pipe 2 is of chromium alloy steel. The ends of the two pipes are beveled in a complementary manner so that when abutted together the tapered face of member 1 fits into the tapered face of member 2. The two are either resistance welded or brazed together along the frusto-conical meeting surfaces 3 therebetween. The members 1 and 2 are subsequently lined with vitreous enameling material and the latter is fused to provide an impervious protective lining 4 bonded to the steel.

The thinning of the edge of the member 1 on the inside allows it to overlap a thicker portion of the edge of member 2 at and for a substantial distance adjacent to the inside line of joinder. By reason of this construction the metal of member 1 immediately adjacent the joinder on the inside will be controlled in its movement under thermal changes by the stronger section of alloy steel. The expansion gradient at the joint will be spread over a greater longitudinal distance and the stresses developed will not be sufficiently concentrated to injure the enamel.

Figure 2:
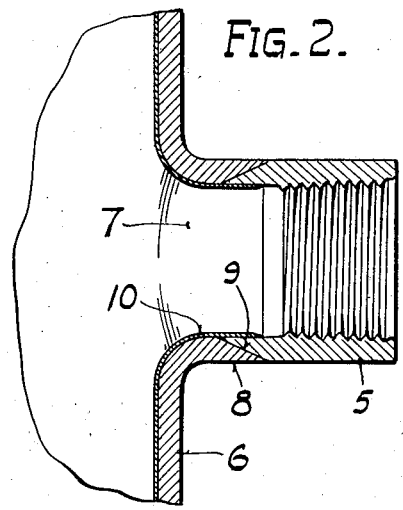
Fig. 2 is a central longitudinal section through a pipe connection for an enamel lined tank.

In Fig. 2 the invention has been applied in attaching a brass nipple 5 to the steel wall 6 of a tank. Here the metal of the tank wall is flanged outwardly around the opening 7 and the flange 8 and nipple 5 are tapered similar to the tapering of the members in Fig. 1.

The tapered face of nipple 5 fits inside of the tapered face of flange 8 and is brazed thereto along the frusto-conical line 9. Ceramic enamel 10 is bonded to the inside of wall 6 and extends over the brazed joint 9.

The thin edge of the brass nipple 5 overlapping the thicker and stronger steel section of the joint results in a control of the movement of the brass in this region more nearly like the movement of the steel under thermal changes. This prevents undue stress concentration that results in injury to the enamel.

Figure 3:
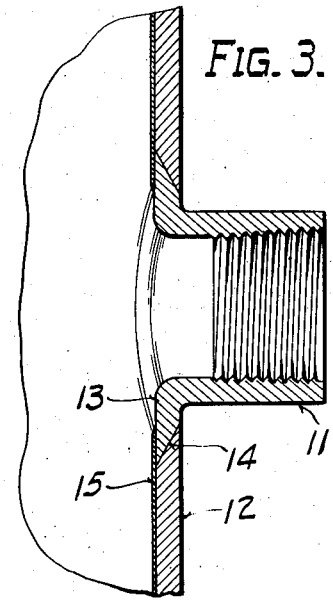
Fig. 3 is a similar section through another type of connection for a tank.

In Fig. 3 the pipe connection 11, of brass, extends through an opening in the tank wall 12. The inner end of connection 11 has a flange 13 overlapping the inner surface of the tank wall. This overlap is preferably obtained by tapering the meeting surfaces along the lines of a frustrum of a cone, as shown, and brazing or welding the two together. The joint 14, thereby provided, has a relatively thin edge of brass, of flange 13, overlying a relatively thick section of the steel tank wall. The enamel lining 15 for the tank extends over the joint and for a short distance over the brass of the connection.

Figure 4:
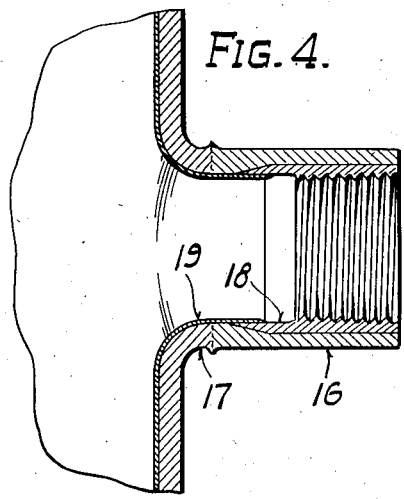
Fig. 4 is a similar section of another type of connection.

In Fig. 4 the nipple 16 is of ordinary steel butt welded to a flange 17 of the tank wall. The nipple 16 has a corrosion resistant alloy lining 18 which is brazed or otherwise secured in the nipple and threaded internally to receive a pipe connection. The lining 18 is tapered or feathered on its inner end to provide the thin section thereof which is controlled in its thermal expansion by the thicker and stronger base metal beneath so that the inside line of joinder does not have concentrated stress that might injure the enamel. The enamel 19 extends as a lining over the butt weld and also over the brazed liner joint.

In carrying out the invention, there may be advantages in some instances in having the member, constructed of the stronger metal, thinned on the enameled side. On the other hand, in most instances, as in Figs. 2 to 4, inclusive, the weaker metal is feathered at the joint on the inside. This makes more certain the gradual control of expansion and contraction so as to prevent concentration of shear stresses in the enamel.

The invention has various applications and embodiments within the scope of the accompanying claims.

I claim:

1. An article having an integral joint between metallic members of different composition and coefficient of expansion and having an enamel coating on one surface thereof extending over the line of the joint and bonded to the surfaces of the respective members, in which one of the members has its edge beveled beneath the enamel coating with the thin edge portion overlapping the relatively thicker section of the other member and integrally joined thereto.

2. An article having an integral joint between metallic members of different composition, strength and coefficient of expansion and having an enamel coating on one surface thereof extending over the line of the joint, in which the members have their joined faces beveled to provide a substantially thin edge of the weaker member overlapping a thicker section of the stronger member adjacent the line of joinder immediately beneath the coating.

3. An article having an integral joint between metallic members of different composition, strength and coefficient of expansion and having an enamel coating on one surface thereof extending over the line of the joint, in which the members have their joined faces beveled to provide a substantially thin edge of the stronger member overlapping a thicker section of the weaker member adjacent the line of joinder immediately beneath the coating.

4. An article having an integral butt joint between two metallic members of substantially equal cross section with different coefficients of thermal expansion and having an enamel coating bonded to one surface thereof and extending over the line of the joint, in which the members have their edge faces beveled to provide a substantially thin edge of each overlapping a thicker section of the other and secured thereto to effect a more gradual change in rate of thermal expansion at the surface from one member to the other across the joint.

5. A tubular article having an integral butt joint between two metallic members of substantially equal cross section with different coefficients of thermal expansion and having a ceramic enamel lining bonded thereto on the inside and extending over the line of the joint, in which the members have their meeting edges beveled to meet in a frustrum of a cone with the thin edge of the member with the lower coefficient of expansion fitting inside of the other member and controlled in its expansion by said other member to prevent a sharp line of differential movement at the joint tending to injure the bond of the enamel.

6. A tubular article having an integral butt joint between two metallic members of substantially equal cross section with different coefficients of thermal expansion and having a ceramic enamel lining bonded thereto on the inside and extending over the line of the joint, in which the members have their meeting edges beveled to meet in a frustrum of a cone with the thin edge of the member with the greater coefficient of expansion fitting inside of the other member and controlled in its expansion by said other member to prevent a sharp line of differential movement at the joint tending to injure the bond of the enamel.

7. A connection for a ceramic enamel lined steel tank comprising a brass fitting having its inner end beveled and overlapping a portion of the tank wall, a brazed joint between said fitting and tank securing the thin edge of the fitting to the inner surface of the latter, and the ceramic enamel lining of the tank extending over the brazed joint and being bonded to the fitting over the thin portion thereof.

8. A connection for a ceramic enamel lined steel tank comprising a tubular member butt welded to a flange in the wall of the tank and having a threaded liner at its outer end secured therein with a feathered inner edge over which the enamel lining of the tank extends and to which said lining is bonded.

9. An article having an integral joint between metallic members of different composition and coefficients of expansion and having a ceramic enamel coating on one surface thereof extending over the line of the joint, in which one of the members has a feather edge beneath the enamel coating overlapping the relatively thicker section of the other member and integrally joined thereto to provide a more gradual transition from the coefficient of expansion of one member to that of the other at the surface directly beneath the enamel coating.

WESLEY G. MARTIN.